United States Patent
Shi et al.

(10) Patent No.: US 12,549,984 B2
(45) Date of Patent: Feb. 10, 2026

(54) METHOD AND APPARATUS FOR RELAXED RADIO RESOURCE MANAGEMENT MEASUREMENT

(71) Applicant: Lenovo (Beijing) Ltd., Beijing (CN)

(72) Inventors: Jie Shi, Haidian District (CN); Lianhai Wu, Chaoyang District (CN); Haiming Wang, Xicheng District (CN); Jing Han, Chaoyang District (CN); Ran Yue, Haidian District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 614 days.

(21) Appl. No.: 17/801,426

(22) PCT Filed: Feb. 27, 2020

(86) PCT No.: PCT/CN2020/077032
§ 371 (c)(1),
(2) Date: Aug. 22, 2022

(87) PCT Pub. No.: WO2021/168754
PCT Pub. Date: Sep. 2, 2021

(65) Prior Publication Data
US 2023/0078923 A1 Mar. 16, 2023

(51) Int. Cl.
*H04W 24/10* (2009.01)
*H04W 24/02* (2009.01)
*H04W 24/08* (2009.01)
*H04W 52/02* (2009.01)

(52) U.S. Cl.
CPC .......... *H04W 24/10* (2013.01); *H04W 24/02* (2013.01); *H04W 24/08* (2013.01); *H04W 52/0216* (2013.01); *H04W 52/0258* (2013.01)

(58) Field of Classification Search
CPC ..... H04W 24/10; H04W 24/02; H04W 24/08; H04W 52/0216; H04W 52/0258; Y02D 30/70
See application file for complete search history.

(56) References Cited

U.S. PATENT DOCUMENTS

2021/0105643 A1* 4/2021 Kim .................. H04W 48/16
2022/0167370 A1* 5/2022 Chen ................. H04W 48/16

FOREIGN PATENT DOCUMENTS

CN         110839254 A     2/2020
WO    WO-2018164552 A1 * 9/2018 ............ H04W 76/30

OTHER PUBLICATIONS

NTT Docomo, Inc. Discussion on UE power consumption reduction in RRM Measurements (Year: 2019).*

(Continued)

*Primary Examiner* — Ayanah S George
(74) *Attorney, Agent, or Firm* — FIG. 1 Patents (57) ABSTRACT

The present application relates to a user equipment, a base station, and a method for relaxed RRM measurement. The base station transmits information to the user equipment. The user equipment receives the information from a base station on a condition for enabling a relaxed RRM measurement, and then performs the relaxed RRM measurement during a period according to the information. The period is associated with a state of the user equipment.

20 Claims, 9 Drawing Sheets

(56) References Cited

OTHER PUBLICATIONS

Huawei, "Remaining issues on time domain measurement relaxation.", 3GPP TSG-RAN WG2 Meeting 107bis, R2-1913568, Chongqing, China [retrieved Aug. 23, 2022]. Retrieved from the internet <https://www.3gpp.org/ftp/tsg_ran WG2_RL2/TSGR2_107bis/Docs>., Oct. 2019, 13 Pages.
Mediatek Inc., "Report of email discussion [105bis#29][NR/Power Saving] RRM solutions", 3GPP TSG-RAN WG2 Meeting #106, R2-1906500, Reno, NV, USA [retrieved Aug. 23, 2022]. Retrieved from the internet <https://www.3gpp.org/ftp/TSG_RAN/WG2_RL2/TSGR2_106/Docs/>., May 2019, 20 Pages.
NTT Docomo, Inc., "Discussion on UE power Consumption Reduction in RRM Measurements", 3GPP TSG RAN WG1 #96, R1-1903236, Athens, Greece [retrieved Aug. 23, 2022]. Retrieved from the internet <https://www.3gpp.org/ftp/tsg_ran/WG1_RL1/TSGR1_96/Docs?sortby=namerev>., Mar. 2019, 6 Pages.
PCT/CN2020/077032, "International Preliminary Report on Patentability", PCT Application No. PCT/CN2020/077032, Sep. 9, 2022, 6 pages.
PCT/CN2020/077032, "International Search Report and Written Opinion", PCT Application No. PCT/CN2020/077032, Oct. 30, 2020, 7 pages.

\* cited by examiner

METHOD AND APPARATUS FOR RELAXED RADIO RESOURCE MANAGEMENT MEASUREMENT

TECHNICAL FIELD

The present disclosure generally relates to radio resource management measurement, and relates more particularly to relaxed radio resource management measurement.

BACKGROUND OF THE INVENTION

In conventional network, Radio Resource Management (RRM) is utilized for managing channel interference, radio resources, other radio transmission characteristics, etc. For some user equipment with reduced capabilities, relaxed RRM is introduced to improve performance of power saving and battery lifetime. However, specific details for base station and user equipment to apply the same relaxed RRM procedure have not been discussed yet and there are still some issues that need to be solved.

BRIEF SUMMARY OF THE INVENTION

One embodiment of the present disclosure provides a method of a user equipment. The method includes: receiving information from a base station on a condition for enabling a relaxed Radio Resource Management (RRM) measurement; and performing the relaxed RRM measurement during a period according to the information, wherein the period is associated with a state of the user equipment.

Another embodiment of the present disclosure provides a method of a base station. The method includes: transmitting information to a user equipment on a condition for enabling a relaxed RRM measurement so that the user equipment performs the relaxed RRM measurement during a period according to the information, wherein the period is associated with a state of the user equipment.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION OF THE INVENTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
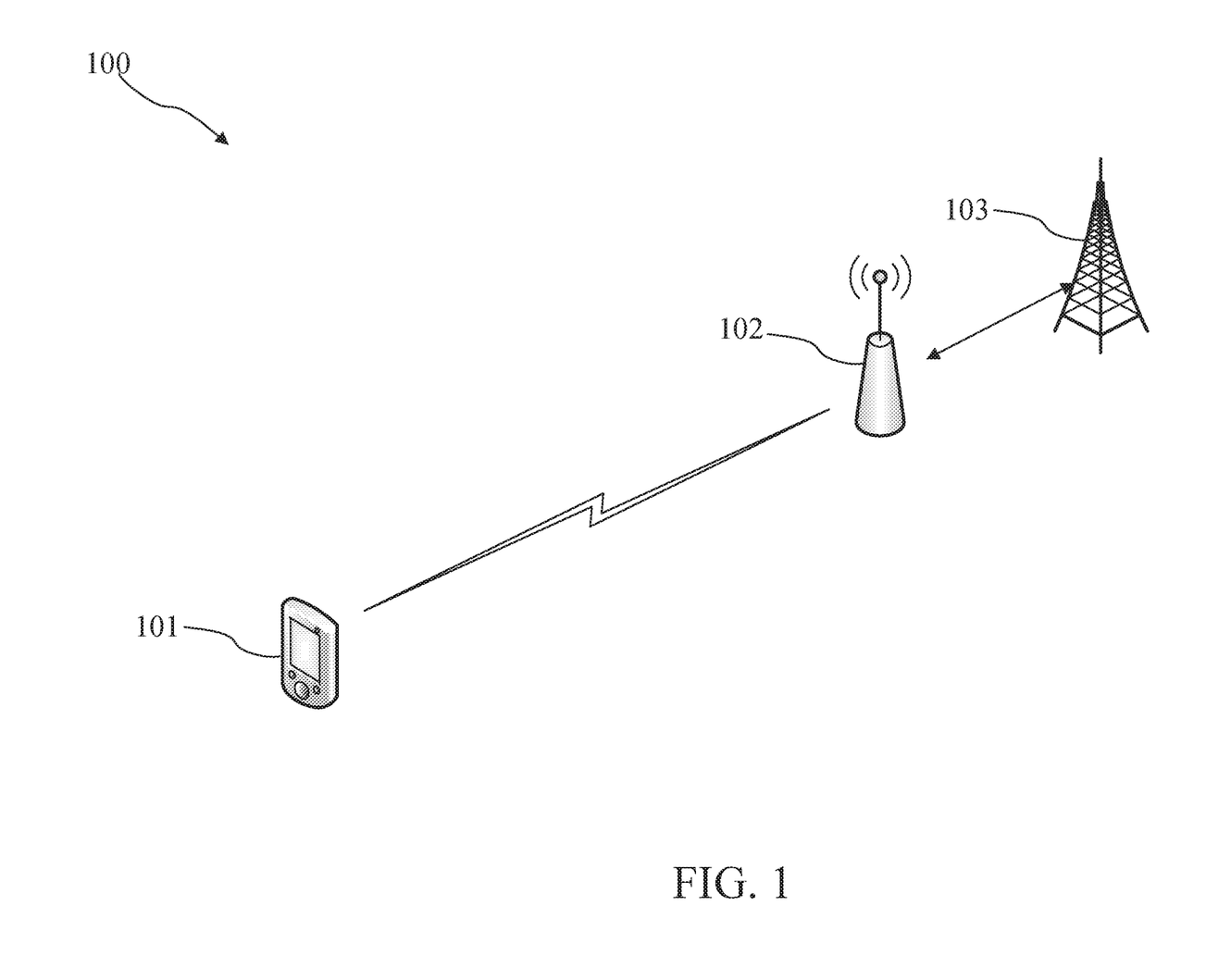
FIG. 1 illustrates a wireless communication system according to an embodiment of the present disclosure.

Referring to FIG. 1, a wireless communication system 100 may include a user equipment (UE) 101, a base station (BS) 102 and a core network (CN) 103. Although a specific number of UE 101, BS 102 and CN 103 are depicted in FIG. 1, it is contemplated that any number of UEs 101, BSs 102 and CNs 103 may be included in the wireless communication system 100.

CN 103 may include a core Access and Mobility management Function (AMF) entity. BS 102, which may communicate with CN 103, may operate or work under the control of the AMF entity. CN 103 may further include a User Plane Function (UPF) entity, which communicatively coupled with the AMF entity.

BS 102 may be distributed over a geographic region. In certain embodiments of the present application, BS 102 may also be referred to as an access point, an access terminal, a base, a base unit, a macro cell, a Node-B, an evolved Node B (eNB), a gNB, a Home Node-B, a relay node, or a device, or described using other terminology used in the art. BS 102 is generally part of a radio access network that may include one or more controllers communicably coupled to one or more corresponding BS(s).

UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE 101 may include, for example, but is not limited to, wearable devices, such as smart watches, fitness bands, optical head-mounted displays, or the like. Moreover, UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE 101 may communicate directly with BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G NR-light of the 3GPP protocol, wherein BSs 102 transmit data using an OFDM modulation scheme on the downlink (DL) and UE 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, BS 102 may communicate using other communication protocols, such as the IEEE 802.11 family of wireless communication protocols. Further, in some embodiments of the present application, BS 102 may communicate over licensed spectrums, whereas in other embodiments BS 102 may communicate over unlicensed spectrums. The present application is not intended to be limited to the implementation of any particular wireless communication system architecture or protocol. In yet some embodiments of present application, BS 102 may communicate with UE 101 using the 3GPP 5G protocols.

In some existed agreements, relaxed Radio Resource Management (RRM) may introduced in the wireless communication system 100 to improve performance of power saving and battery lifetime of UE 101. However, specific details for UE 101 and BS 102 to apply the same relaxed RRM procedure have not been discussed yet and there are still some issues that need to be solved.

Figure 2:
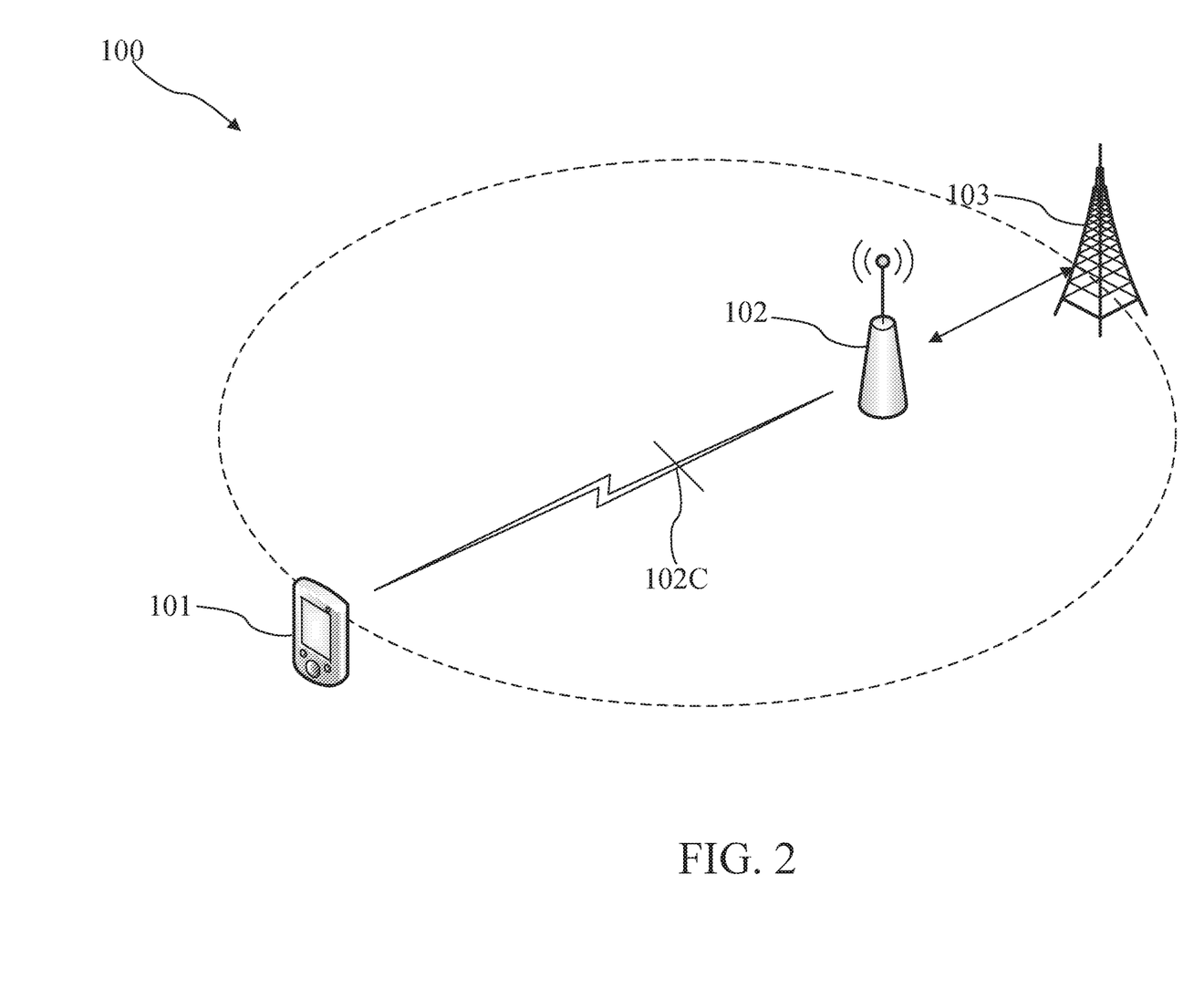
FIG. 2 illustrates data transmission in a wireless communication system according to an embodiment of the present disclosure.

Referring to FIG. 2, BS 102 may transmit information 102C to UE 101. Then, UE 101 may receive the information 102C from BS 102 on a condition for enabling a relaxed RRM measurement. Accordingly, UE 101 may perform the relaxed RRM measurement during a period according to the information. It should be noted that the period may be associated with a state of UE 101. Particularly, the period may be dedicated to the state of UE 101 by BS 102, and the state may include mobility information of UE 101 and/or a position of UE 101.

In some embodiments, the period may be applied in the following UE measurement procedure:

when UE 101 is required to perform intra-frequency or inter-frequency measurement according to the measurement rules, UE 101 may choose not to perform intra-frequency or inter-frequency measurements when:
  the relaxed monitoring criterion by some definition is fulfilled for another period of T, and
  less than the time of the period has passed since measurements for cell reselection were last performed, and
  UE 101 has performed intra-frequency or inter-frequency measurements for at least another period of T after selecting or reselecting a new cell.

In some embodiments, T may be a kind of time interval, and T may be configurable for different relaxed monitoring criterions.

In some embodiments, the period may be applied in the following UE measurement procedure:

when UE 101 is required to perform intra-frequency or inter-frequency measurement according to the measurement rules, UE 101 may choose not to perform intra-frequency or inter-frequency measurements when:
  the relaxed monitoring criterion by some definition is fulfilled, and
  less than the time of the period has passed since measurements for cell reselection were last performed.

In some embodiments, the definition on relaxed monitoring criterion in above UE measurement procedure may be related to one or the combination of the UE's statuses which are: (a) UE is stationary; (b) UE is low mobility; (c) UE is mobile; (d) UE is not in the cell edge; and (e) UE is in the cell edge. In some embodiments, the definition on relaxed monitoring criterion in above UE measurement procedure may be one of the UE's statuses which are: (a) UE is stationary and UE is in the cell edge; (b) UE is stationary and UE is not in the cell edge; (c) UE is low mobility and UE is in the cell edge; and (d) UE low mobility and UE is not in the cell edge.

Accordingly, when UE 101 performs the relaxed RRM measurement during period, it means UE 101 performs the relaxed RRM measurement at some time points during the period. UE 101 will not perform the relaxed RRM measurement or perform the normal measurement once the time based on the period is expired.

In some embodiments, UE which is near a cell edge of BS 102 may suffer more changing of measurement quality caused by neighbor cell of another BS, and may be more possible to select or reselect to the neighbor cell of another BS. Accordingly, the period of preforming the relaxed RRM measurement may be determined according to a position of UE. In detail, BS 102 may determine a plurality of periods and broadcast the periods to UEs located in different positions within the cell of BS 102.

Figure 3:
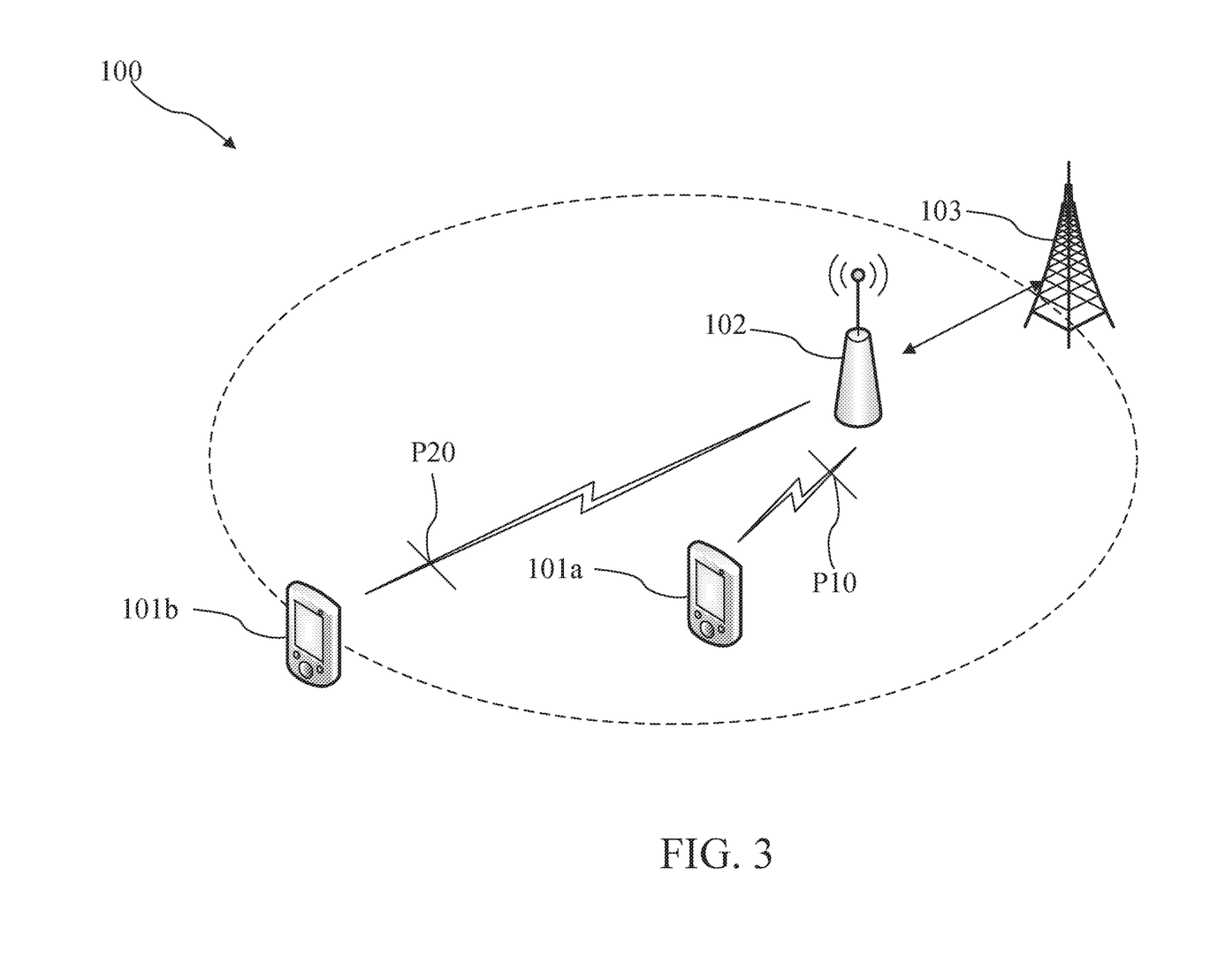
FIG. 3 illustrates data transmission in a wireless communication system according to an embodiment of the present disclosure.

For example, referring to FIG. 3, BS 102 determines two periods P10 and P20 which are respectively dedicated to UE 101a within cell center of BS 102 and UE 101b near cell edge of BS 102. Comparing to UE 101a within the cell center of BS 102, since UE 101b near the cell edge of BS 102 may be more possible to select or reselect to neighbor cell, the period P20 may be configured as shorter than the period P10.

In some embodiments, UE which reports lower Reference Signal Receiving Power (RSRP) to BS 102 may be more possible to select or reselect to neighbor cell. Accordingly, the period of preforming the relaxed RRM measurement may be determined according to reporting RSRP of UE. In detail, BS 102 may determine a plurality of periods and broadcast the periods to UEs reported different RSRPs within the cell of BS 102.

Figure 4:
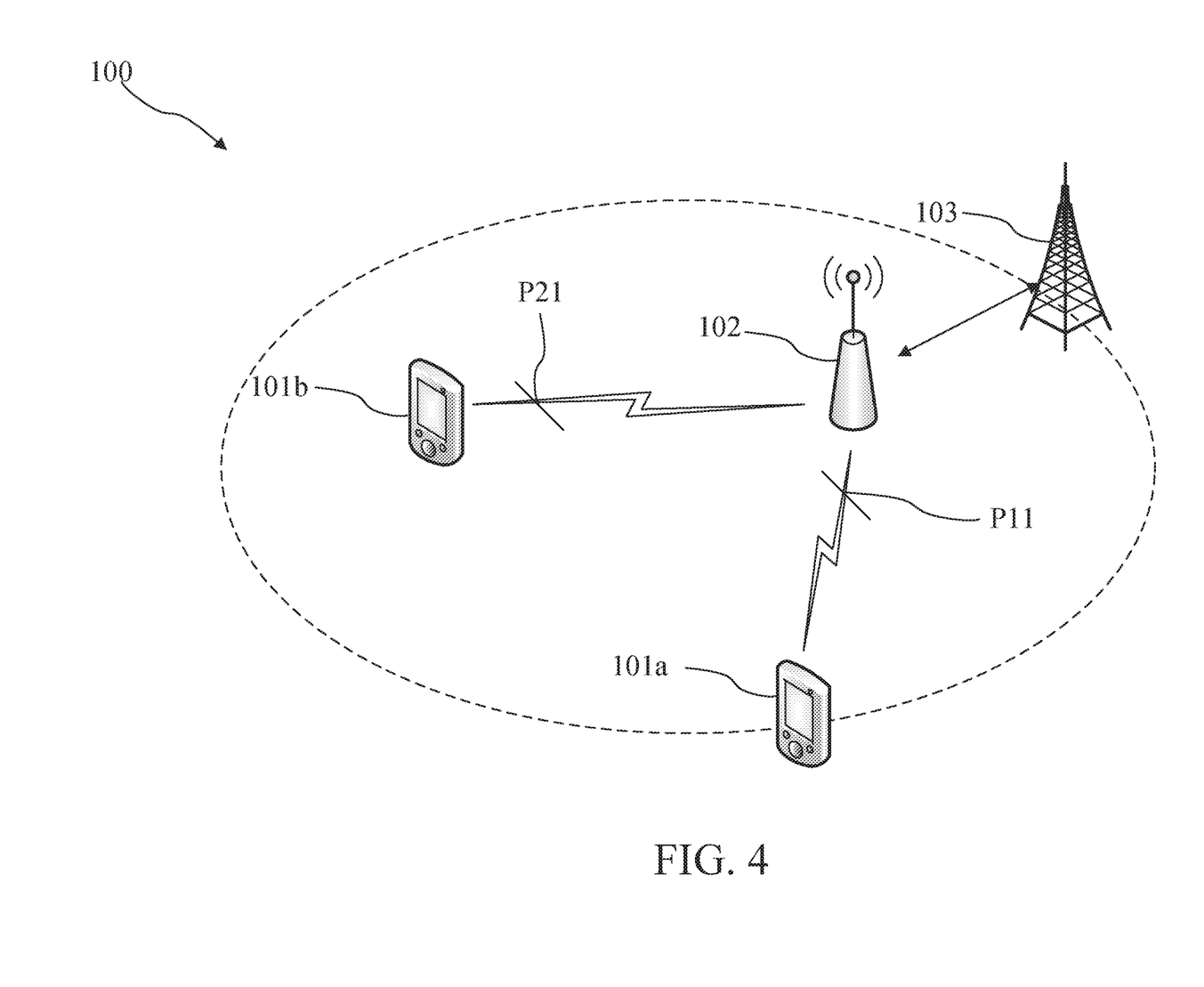
FIG. 4 illustrates data transmission in a wireless communication system according to an embodiment of the present disclosure.

For example, referring to FIG. 4, BS 102 determines two periods P11 and P21 which are respectively dedicated to UE 101a with a RSRP higher than a threshold and UE 101b with a RSRP lower than the threshold. Comparing to UE 101a with higher RSRP, since UE 101b with lower RSRP may be more possible to select or reselect to neighbor cell, the period P21 may be configured as shorter than the period P11.

In some embodiments, UE which is with higher mobility may be more possible to select or reselect to neighbor cell. Accordingly, the period of preforming the relaxed RRM measurement may be determined according to mobility of UE. In detail, BS 102 may determine a plurality of periods and broadcast the periods to UEs with different mobility within the cell of BS 102.

Figure 5:
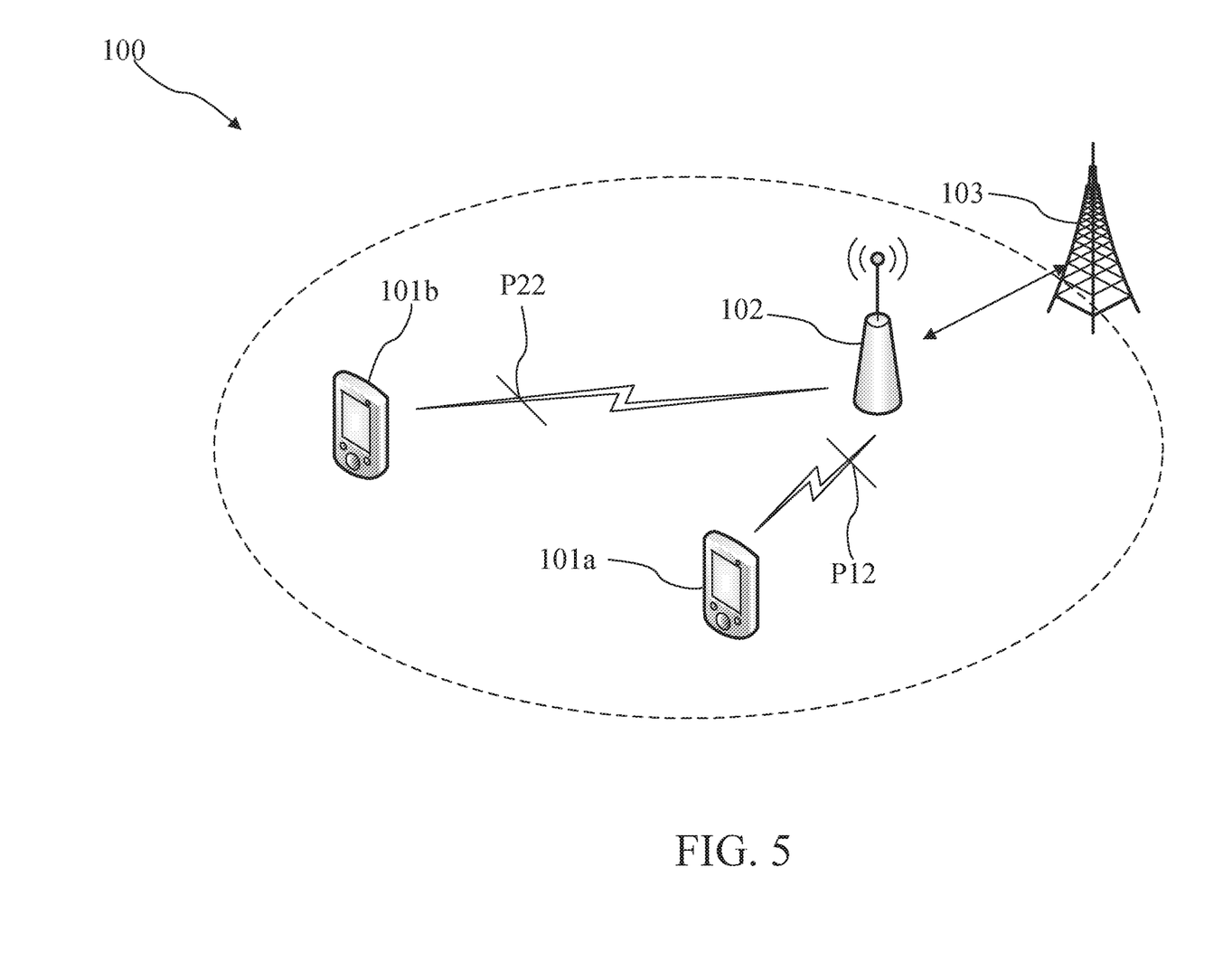
FIG. 5 illustrates data transmission in a wireless communication system according to an embodiment of the present disclosure.

For example, referring to FIG. 5, BS 102 determines two periods P12 and P23 which are respectively dedicated to UE 101a with lower mobility and UE 101b with higher mobility. Comparing to UE 101a with lower mobility, since UE 101b with higher mobility may be more possible to select or reselect to neighbor cell, the period P22 may be configured as shorter than the period P12.

In some embodiments, different periods of preforming the relaxed RRM measurement may be applied for different service types. Accordingly, the period of preforming the relaxed RRM measurement may be determined according to service type. In detail, UEs may select period, which corresponds to a current service type with BS 102, from a plurality of periods.

In some embodiments, the service type may include one or combination of Mobile-Originated (MO) service, Mobile-Terminated (MT) service, MO for data service, MO for signaling service, bearer-specific service, logical channel specific service, logical channel group specific service, or carrier specific service.

Figure 6:
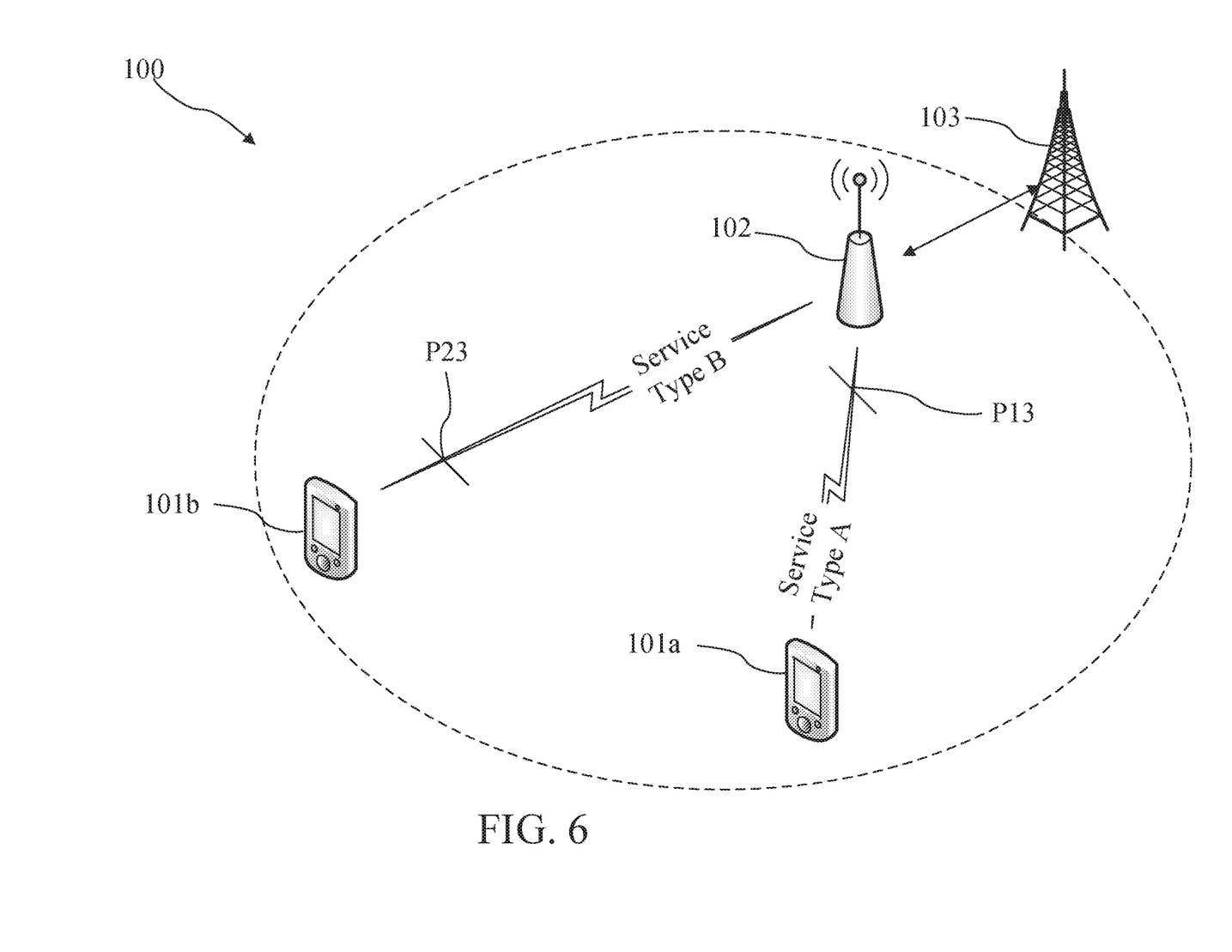
FIG. 6 illustrates data transmission in a wireless communication system according to an embodiment of the present disclosure.

For example, referring to FIG. 6, BS 102 determines two periods P13 and P23 which are respectively dedicated to service type A and service type B. When a current service type of UE 101a is service type A, UE selects period P1 corresponding to service type A. In some implementations, BS 102 may determine the plurality of periods for the plurality of service types and broadcast the periods to UEs. In some implementations, the plurality of periods for the plurality of service types may be included in a default setting which is pre-configured in UE 101 and BS 102.

In some embodiments, UE which is with higher number of cell reselection within a time window in the past may be more possible to select or reselect to neighbor cell. Accordingly, the period of preforming the relaxed RRM measurement may be determined according to number of cell reselection within the time window of UE. Or, the period of preforming the relaxed RRM measurement may be determined according to the UE mobility level information.

Figure 7:
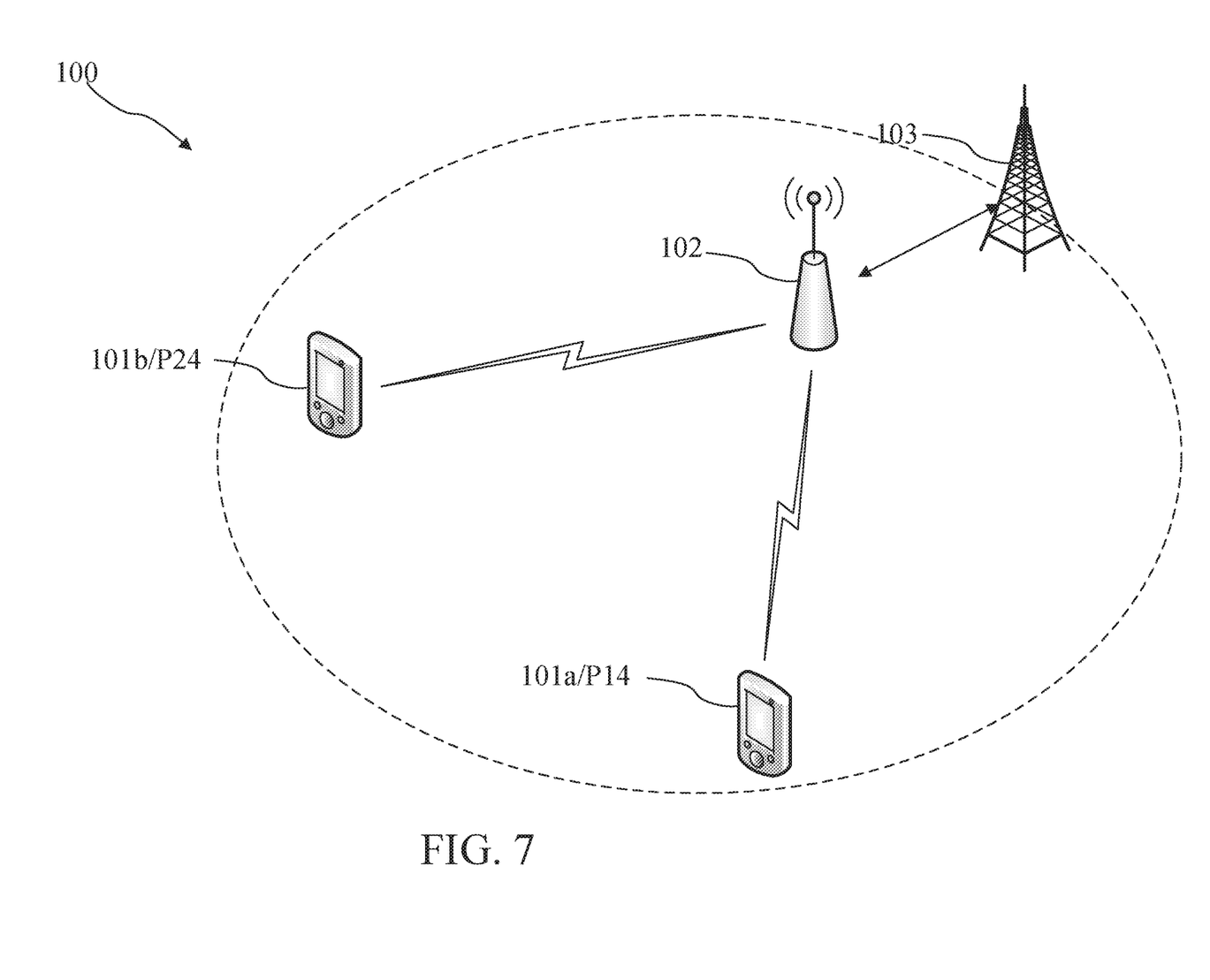
FIG. 7 illustrates data transmission in a wireless communication system according to an embodiment of the present disclosure.

For example, referring to FIG. 7, when UE 101a determines that a number of cell reselection within the time window is less than a threshold, period P14 is applied to UE 101a for preforming the relaxed RRM measurement. When UE 101b determines that a number of cell reselection within the time window is greater than the threshold, period P24 is applied to UE 101b for preforming the relaxed RRM measurement. Comparing to UE 101a with lower number of cell reselection within the time window, since UE 101bn with higher number of cell reselection within the time window may be more possible to select or reselect to neighbor cell, the period P24 may be configured as shorter than the period P14.

The condition for enabling the relaxed RRM measurement may be configured with different network parameters or criterions. In other words, the condition configured with different network parameters or criterions may be considered to trigger UE 101 to perform the relaxed RRM measurement.

In some embodiments, the condition for triggering the relaxed RRM measurement may include criterions of that: UE 101 is adjacent to an edge of cell of BS 102 and UE 101 moves within the cell of BS 102 according to mobility information of UE 101. In some implementations, the criterions may be that: (1) a serving cell measurement value is less than a threshold/equal to or less than the threshold; and (2) UE 101 is with low mobility or is stationary.

For example, the relaxed RRM measurement is performed by UE 101 when the following criterions are fulfilled:
(1) $S_{rxlev} < S_{searchDeltaP1}$, or $S_{rxlev} <= S_{searchDeltaP1}$ where $S_{rxlev}$ is the serving cell measurement value and $S_{searchDeltaP1}$ is the threshold; and
(2) UE 101 is with low mobility or is stationary, where low mobility or stationary is defined as: (a) a number of cell reselection performed by UE 101 within a time window is less than a threshold; or (b) a variation of serving cell measurement value of UE 101 is less than another threshold/equal to or less than the another threshold.

In some embodiments, regarding (b) a variation of serving cell measurement value of UE 101 is less than the another threshold/equal to or less than another threshold, it may be defined as the following relaxed monitoring description:

The relaxed monitoring criterion is fulfilled when:
$(Srxlev_{Ref} - Srxlev) < S_{searchDeltaP}$
Where:
Srxlev=current Srxlev value of the serving cell (dB).
$Srxlev_{Ref}$=reference Srxlev value of the serving cell (dB), set as follows:
After selecting or reselecting a new cell, or
If $(Srxlev - Srxlev_{Ref}) > 0$, or
If the relaxed monitoring criterion has not been met for $T_{SearchDeltaP}$:
the UE shall set the value of $Srxlev_{Ref}$ to the current Srxlev value of the serving cell;
$T_{SearchDeltaP}$ is time range, for example, it may be 5 minutes, or the eDRX cycle length if eDRX is configured and the eDRX cycle length is longer than 5 minutes.

In some implementation, $S_{rxlev}$ is the serving cell measurement value, it could be replaced by other type of serving cell measurement value, such as the measurement value based on RSRP, RSPQ, SINR and so on.

In some implementations, the criterions may further be that: (1) the serving cell measurement value is less than a threshold/equal to or less than the threshold; (2) the serving cell measurement value is large than another threshold/equal to or larger than the another threshold; and (3) UE 101 is with low mobility or is stationary.

For example, the relaxed RRM measurement is performed by UE 101 when the following criterions are fulfilled:
(1) $S_{searchDeltaP0} < S_{rxlev} < S_{searchDeltaP1}$, $S_{searchDeltaP0} < S_{rxlev} <= S_{searchDeltaP1}$, $S_{searchDeltaP0} <= S_{rxlev} < S_{searchDeltaP1}$, or $S_{searchDeltaP0} <= S_{rxlev} <= S_{searchDeltaP1}$, where $S_{rxlev}$ is the serving cell measurement value, $S_{searchDeltaP1}$ is the threshold and $S_{searchDeltaP0}$ is the another threshold; and
(2) UE 101 is with low mobility or is stationary, where low mobility or stationary is defined as: (a) a number of cell reselection performed by UE 101 within a time window is less than a threshold; or (b) a variation of serving cell measurement value of UE 101 is less than another threshold/equal to or less than the another threshold.

In some embodiments, regarding (b) a variation of serving cell measurement value of UE 101 is less than another threshold/equal to or less than the another threshold, it may be defined as the following relaxed monitoring description:

The relaxed monitoring criterion is fulfilled when:
(Srxlev$_{Ref}$−Srxlev)<S$_{searchDeltaP}$
Where:
Srxlev=current Srxlev value of the serving cell (dB).
Srxlev$_{Ref}$=reference Srxlev value of the serving cell (dB), set as follows:
After selecting or reselecting a new cell, or
If (Srxlev−Srxlev$_{Ref}$)>0, or
If the relaxed monitoring criterion has not been met for T$_{SearchDeltaP}$:
the UE shall set the value of Srxlev$_{Ref}$ to the current Srxlev value of the serving cell;
T$_{searchDeltaP}$=5 minutes, or the eDRX cycle length if eDRX is configured and the eDRX cycle length is longer than 5 minutes.

In some implementation, the serving cell measurement value be or be replaced by the measurement value based on RSRP, RSPQ, SINR and so on.

In some implementation, the neighbor cell measurement value be or be replaced by the measurement value based on RSRP, RSPQ, SINR and so on.

In some embodiments, the condition for triggering the relaxed RRM measurement may include criterions of that UE 101 is within a zone which may be determined by UE 101 or BS 102. In detail, cells of the wireless communication system 100 may be separated as a plurality of zones. In some implementations, for each zone, BS 102 may configure a configuration of dedicated frequency, dedicated cell and/or Bandwidth Parts (BWP) for cell selection or cell reselection. BS 102 may transmit the configuration to UE 101. Next, UE 101 may receive the configuration. Accordingly, when UE 101 is within one zone, UE 101 may perform the relaxed RRM measurement according to the configuration corresponding to this zone.

In some implementations, UE 101 may record behavior of cell selection and cell reselection for a dedicated zone. Then, UE 101 may transmit a configuration to BS 102 for informing BS 102 of that UE 101 is configured to select or reselect at least one cell or at least one frequency within the dedicated zone.

In some embodiments, the condition for triggering the relaxed RRM measurement may include criterions of that: UE 101 is connected to BS 102 via a relay node. In detail, UE 101 may be attached to BS 102 by the relay node. Therefore, UE 101 may receive downlink data from BS 102 and transmit uplink to BS 102 data via the relay node. Accordingly, the relay node may transmit information to UE 101 for indicating UE 101 whether the relay node selects or reselects to a new cell, or indicating UE 101 whether to perform cell selection, cell reselection, or relaxed RRM measurement. In some embodiments, the relay node may transmit a timer to UE 101. UE 101 may perform a normal RRM measurement when the timer expires. Once UE 101 receives the information of that relay node selects or reselects to a new cell, UE 101 may perform the neighbor cell measurement, or cell reselection procedure. If UE 101 does not receive the information of that relay node selects or reselects to a new cell or UE 101 receives the information of that relay node does not select or reselect to a new cell, UE 101 may perform the relaxed RRM measurement.

In some embodiments, considering that the wireless communication system 100 may include Self-Organizing Network (SON), the relaxed RRM measurement may be enabled or disabled for UE 101 by BS 102. In detail, BS 102 may transmit a message to UE 101. Then, after receiving the message, UE 101 may enable or disable the relaxed RRM measurement according to the message.

For example, when BS 102 determines that a new neighbor cell is deployed by SON, BS 102 transmits a message to UE 101 which is near cell edge of BS 102 for disabling the relaxed RRM measurement. For another example, when BS 102 detects a new neighbor cell added in SON, and determines a serving cell measurement quality of UE 101 is less than or equal to a threshold, BS 102 may transmit a message to UE 101 for disabling the relaxed RRM measurement. After UE 101 receives the message from BS 102, UE 101 disables the relaxed RRM measurement.

In some embodiments, considering the new cell deployment, BS 102 may configure UE 101 with dedicated condition to disable the relaxed RRM measurement. For examples, BS 102 may configure UE 101, which is in the cell center, to disable the relaxed RRM measurement. BS 102 may configure UE 101, which is in the cell edge, to disable the relaxed RRM measurement. BS 102 may configure UE 101, which is in the cell edge, to enable the relaxed RRM measurement. BS 102 may configure UE 101, which is without low mobility or with high mobility, to disable the relaxed RRM measurement. BS 102 may configure UE 101, which becomes mobile, to disable the relaxed RRM measurement. BS 102 may indicate UE 101 that a new cell is deployed or neighbor cell channel quality is changed by explicit or implicit signaling, and then UE 101 may disable the relaxed RRM measurement based on network explicit or implicit signaling.

In some embodiments, UE 101 may perform the relaxed RRM measurement on dedicated frequencies or cells. In some implementations, UE 101 may receive a duration, a maximum number and a threshold from BS 102. Then, UE 101 may detect a number of frequencies within the duration. Particularly, the number may be equal to or less than the maximum number and qualities of the detected frequencies should be equal to or greater than the threshold. Accordingly, UE 101 may monitor the detected frequencies only and may perform the relaxed RRM measurement at the detected frequencies. For example, the duration is t1, the maximum number is 5 and the threshold is th1. When UE 101 detects 10 frequencies, UE 101 determines at most 5 frequencies, whose communication qualities are equal to or greater than the threshold th1, for performing the relaxed RRM measurement. In some embodiments, UE 101 may store at lase one of the duration, the maximum number and the threshold by itself.

In some implementations, UE 101 may receive a duration, a maximum number and a threshold from BS 102. Then, UE 101 may detect a number of cells within the duration while the cells may be associated with one frequency. Particularly, the number may be equal to or less than the maximum number and channel qualities of the detected cells are equal or greater than the threshold. Accordingly, UE 101 may monitor the detected cells only and may perform the relaxed RRM measurement to the detected cells. For example, the duration is t2, the maximum number is 2 and the threshold is th2. When UE 101 detects 4 cells associated with the same frequency, UE 101 determines at most 2 cells, whose communication qualities are equal to or greater than the threshold th2, for performing the relaxed RRM measurement. In some embodiments, UE 101 may store at least one of the duration, the maximum number and the threshold by itself.

In some implementations, for fallback purpose, a timer can be set to UE 101. When timer is expired, the normal frequency or cell measurement (for example, UE 101 measures all the frequency and cell) will be performed by UE 101. Alternatively, different fallback timer can be used respectively for frequency and cell measurement.

In some implementations, the mentioned durations from BS 102 may be applied at the beginning part of the period, or at a dedicated part of the period.

In should be noted that, in some embodiments, the relaxed RRM measurement may include one or combination of the following measurements:
  a) It is allowed to skip neighbor cell measurements.
  b) It is allowed to perform measurements with longer intervals. The measurements may be one or combination of the serving cell measurement, neighbor cell measurement, intra-frequency measurement, or inter-frequency measurement.
  c) It is allowed to perform measurement with limited frequencies and/or limited cells.

In should be noted that, in some embodiments, the relaxed RRM measurement may include one or combination of the following measurements:
  d) It is allowed to skip neighbor cell measurement, and perform the serving cell measurement with longer intervals.
  e) It is allowed to skip the serving cell measurement, and perform the neighbor cell measurement with longer intervals.
  f) It is allowed to perform the serving cell measurement with normal interval, and perform the neighbor cell measurement with longer intervals.

In some implementations, a longer interval means an interval which is longer than the normal interval applied in corresponding normal measurement. The normal interval means an original interval applied in corresponding normal measurement.

In should be noted that, in some embodiments, the relaxed RRM measurement may include one or combination of above option a) to option f).

It should be noted that, in some embodiments, the duration, the maximum number and the threshold may be included in System Information Block (SIB), Radio Resource Control (RRC) message or Media Access Control (MAC) message.

Figure 8:
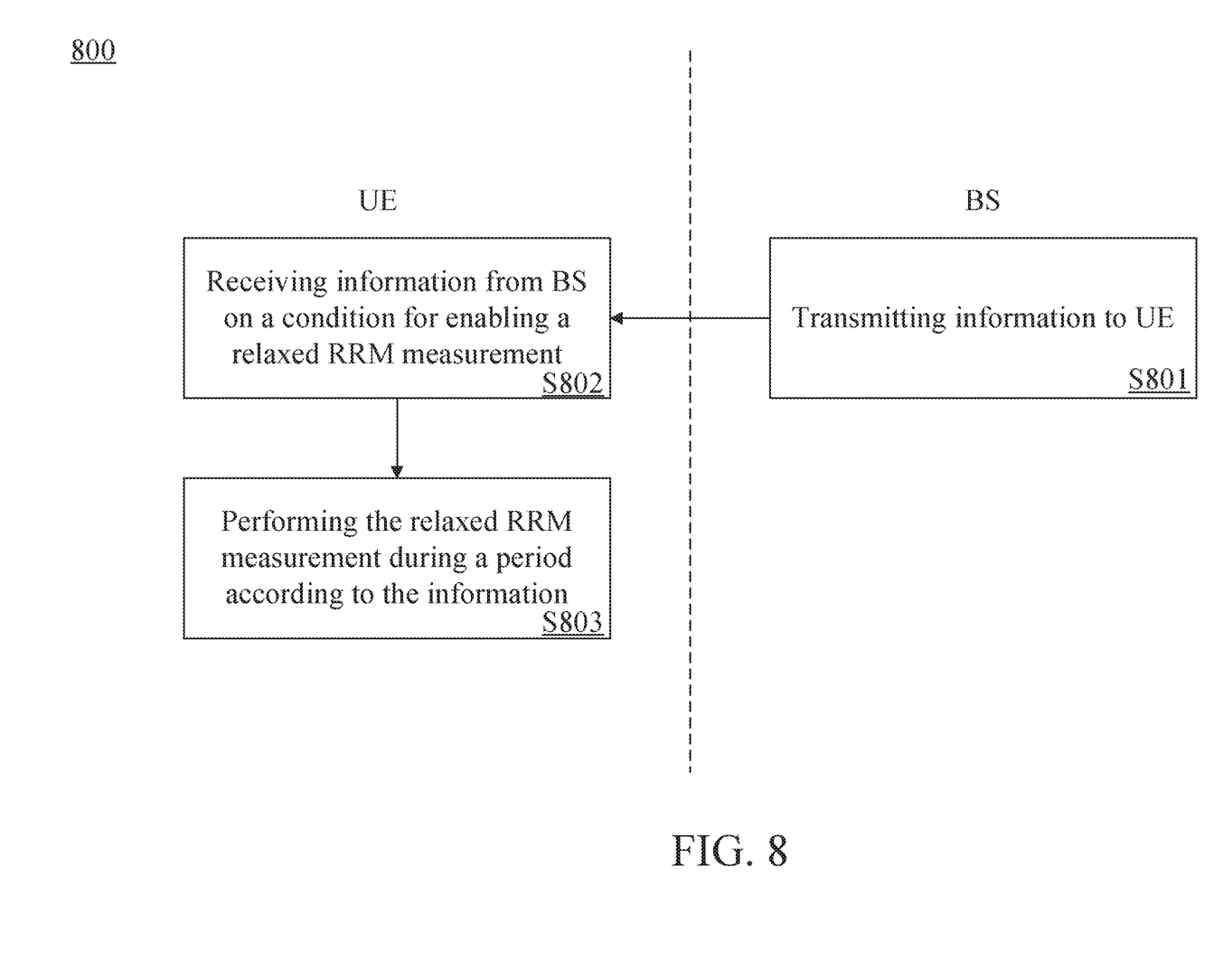
FIG. 8 illustrates a flow chart of a method for wireless communications according to an embodiment of the present disclosure.

FIG. 8 illustrates a flow chart of a method for wireless communications in accordance with some embodiments of the present application. Referring to FIG. 8, method 800 is performed by a UE (e.g., UE 101) and a BS (e.g., BS 102) in some embodiments of the present application.

Operation S801 is executed to transmit, by BS, information to UE. Operation S802 is executed to receive, by UE, the information from BS on a condition for enabling a relaxed RRM measurement. Operation S803 is executed to perform, by UE, the relaxed RRM measurement during a period according to the information. The period may be associated with a state of UE. Particularly, the period may be dedicated to the state of UE by BS, and the state may include mobility information of UE and/or a position of UE.

In some embodiments, UE which is near a cell edge of BS may suffer more changing of measurement quality caused by neighbor cell of another BS, and may be more possible to select or reselect to the neighbor cell of another BS. Accordingly, the period of preforming the relaxed RRM measurement may be determined according to a position of UE. In detail, BS may determine a plurality of periods and broadcast the periods with the information to UEs located in different positions within the cell of BS.

In some embodiments, UE which reports lower RSRP to BS may be more possible to select or reselect to neighbor cell. Accordingly, the period of preforming the relaxed RRM measurement may be determined according to reporting RSRP of UE. In detail, BS may determine a plurality of periods and broadcast the periods with the information to UEs reported different RSRPs within the cell of BS.

In some embodiments, UE which is with higher mobility may be more possible to select or reselect to neighbor cell. Accordingly, the period of preforming the relaxed RRM measurement may be determined according to mobility of UE. In detail, BS may determine a plurality of periods and broadcast the periods with the information to UEs with different mobility within the cell of BS.

In some embodiments, different periods of preforming the relaxed RRM measurement may be applied for different service types. Accordingly, the period of preforming the relaxed RRM measurement may be determined according to service type. In detail, UEs may select period, which corresponds to a current service type with BS, from a plurality of periods.

In some embodiments, the service type may include one or combination of MO service, MT service, MO for data service, MO for signaling service, bearer-specific service, logical channel specific service, or carrier specific service.

In some embodiments, UE which is with higher number of cell reselection within a time window in the past may be more possible to select or reselect to neighbor cell. Accordingly, the period of preforming the relaxed RRM measurement may be determined according to number of cell reselection within the time window of UE.

In some embodiments, the condition for triggering the relaxed RRM measurement may include criterions of that: UE is adjacent to an edge of cell of BS and UE moves within the cell of BS according to mobility information of UE. In some implementations, the criterions may be that: (1) a serving cell measurement value is less than a threshold/equal to or less than the threshold; and (2) UE is with low mobility or is stationary.

In some implementations, the criterions may further be that: (1) the serving cell measurement value is less than a threshold/equal to or less than the threshold; (2) the serving cell measurement value is large than another threshold/equal to or larger than the another threshold; and (3) UE is with low mobility or is stationary.

In some embodiments, the condition for triggering the relaxed RRM measurement may include criterions of that UE is within a zone which may be determined by UE or BS. In detail, cells of the wireless communication system may be separated as a plurality of zones. In some implementations, for each zone, BS may configure a configuration of dedicated frequency, dedicated cell and/or BWP for cell selection or cell reselection. BS may transmit the configuration to UE. Next, UE may receive the configuration. Accordingly, when UE is within one zone, UE may perform the relaxed RRM measurement according to the configuration corresponding to this zone.

In some implementations, UE may record behavior of cell selection and cell reselection for a dedicated zone. Then, UE may transmit a configuration to BS for informing BS of that UE is configured to select or reselect at least one cell or at least one frequency within the dedicated zone.

In some embodiments, the condition for triggering the relaxed RRM measurement may include criterions of that: UE is connected to BS via a relay node. In detail, UE may be attached to BS by the relay node. Therefore, UE may receive downlink data from BS and transmit uplink to BS data via the relay node. Accordingly, the relay node may transmit information to UE for indicating UE whether the relay node selects or reselects to a new cell, or indicating UE whether to perform cell selection, cell reselection, or relaxed RRM measurement. In some embodiments, the relay node may transmit a timer to UE. UE may perform a normal RRM measurement when the timer expires. Once UE receives the information of that relay node selects or reselects to a new cell, UE may perform the neighbor cell measurement, or cell reselection procedure. If UE does not receive the information of that relay node selects or reselects to a new cell or UE receives the information of that relay node does not select or reselect to a new cell, UE may perform the relaxed RRM measurement.

In some embodiments, considering that the wireless communication system may include SON, the relaxed RRM measurement may be enabled or disabled for UE by BS. In detail, BS may transmit a message to UE. Then, after receiving the message, UE may enable or disable the relaxed RRM measurement according to the message.

For example, when BS determines that a new neighbor cell is deployed by SON, BS transmits a message to UE which is near cell edge of BS for disabling the relaxed RRM measurement. For another example, when BS detects a new neighbor cell added in SON, and determines a serving cell measurement quality reported from UE is less than or equal to a threshold, BS may transmit a message to UE for disabling the relaxed RRM measurement. After UE receives the message from BS, UE disables the relaxed RRM measurement.

In some embodiments, considering the new cell deployment, BS may configure UE with dedicated condition to disable the relaxed RRM measurement. For examples, BS may configure UE, which is in the cell center, to disable the relaxed RRM measurement. BS may configure UE, which is in the cell edge, to disable the relaxed RRM measurement. BS may configure UE, which is in the cell edge, to enable the relaxed RRM measurement. BS may configure UE, which is without low mobility or with high mobility, to disable the relaxed RRM measurement. BS may configure UE, which becomes mobile, to disable the relaxed RRM measurement. BS may indicate UE that a new cell is deployed or neighbor cell channel quality is changed by explicit or implicit signaling, and then UE may disable the relaxed RRM measurement based on network explicit or implicit signaling In some embodiments, UE may perform the relaxed RRM measurement on dedicated frequencies or cells. In some implementations, UE may receive a duration, a maximum number and a threshold from BS. Then, UE may detect a number of frequencies within the duration. Particularly, the number may be equal to or less than the maximum number and qualities of the detected frequencies should be equal to or greater than the threshold. Accordingly, UE may monitor the detected frequencies only and may perform the relaxed RRM measurement at the detected frequencies. In some embodiments, UE may store at least one of the duration, the maximum number and the threshold by itself.

In some implementations, UE may receive a duration, a maximum number and a threshold from BS. Then, UE may detect a number of cells within the duration while the cells may be associated with one frequency. Particularly, the number may be equal to or less than the maximum number and channel qualities of the detected cells are equal or greater than the threshold. Accordingly, UE may monitor the detected cells only and may perform the relaxed RRM measurement to the detected cells. In some embodiments, UE may store at least one of the duration, the maximum number and the threshold by itself.

In some implementations, the mentioned durations from BS may be applied at the beginning part of the period, or at a dedicated part of the period.

In should be noted that, in some embodiments, the relaxed RRM measurement may include one or combination of the following measurements:
 a) It is allowed to skip neighbor cell measurements.
 b) It is allowed to perform measurements with longer intervals. The measurements may be one or combination of the serving cell measurement, neighbor cell measurement, intra-frequency measurement, or inter-frequency measurement.
 c) It is allowed to perform measurement with limited frequencies and/or limited cells.

In should be noted that, in some embodiments, the relaxed RRM measurement may include one or combination of the following measurements:
 d) It is allowed to skip neighbor cell measurement, and perform the serving cell measurement with longer intervals.
 e) It is allowed to skip the serving cell measurement, and perform the neighbor cell measurement with longer intervals.
 f) It is allowed to perform the serving cell measurement with normal interval, and perform the neighbor cell measurement with longer intervals.

In some implementations, a longer interval means an interval which is longer than the normal interval applied in corresponding normal measurement. The normal interval means an original interval applied in corresponding normal measurement.

In should be noted that, in some embodiments, the relaxed RRM measurement may include one or combination of above option a) to option f).

Figure 9:
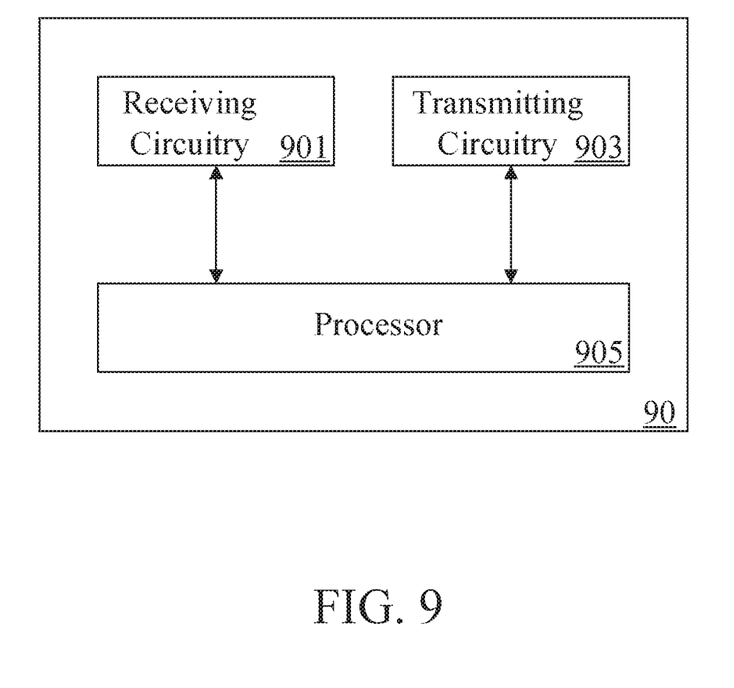
FIG. 9 illustrates an example block diagram of an apparatus according to an embodiment of the present disclosure.

FIG. 9 illustrates an example block diagram of an apparatus 90 according to an embodiment of the present disclosure.

As shown in FIG. 9, the apparatus 90 may include at least one non-transitory computer-readable medium (not illustrated in FIG. 9), a receiving circuitry 901, a transmitting circuitry 903, and a processor 905 coupled to the non-transitory computer-readable medium (not illustrated in FIG. 9), the receiving circuitry 901 and the transmitting circuitry 903. The apparatus 90 may be a user equipment or a base station.

Although in this figure, elements such as processor 905, transmitting circuitry 903, and receiving circuitry 901 are described in the singular, the plural is contemplated unless limitation to the singular is explicitly stated. In some embodiments of the present disclosure, the receiving circuitry 901 and the transmitting circuitry 903 are combined into a single device, such as a transceiver. In certain embodiments of the present disclosure, the apparatus 90 may further include an input device, a memory, and/or other components.

In some embodiments of the present disclosure, the non-transitory computer-readable medium may have stored thereon computer-executable instructions to cause a processor to implement the method with respect to the base station as described above. For example, the computer-executable instructions, when executed, cause the processor 905 interacting with receiving circuitry 901 and transmitting circuitry 903, so as to perform the operations with respect to BS depicted in FIGS. 1 to 7.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 90 interacting with receiving circuitry 901 and transmitting circuitry 903, so as to perform the operations with respect to UE depicted in FIGS. 1 to 7.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

We claim:

1. A method performed by a user equipment (UE), the method comprising:
   receiving information on a condition for enabling a relaxed Radio Resource Management (RRM) measurement, wherein the condition indicates that the UE is within a zone;
   receiving a configuration of a dedicated frequency, a dedicated cell, bandwidth parts (BWPs), or a combination of the dedicated frequency, the dedicated cell, and the BWPs for cell selection or cell reselection within the zone associated with the relaxed RRM measurement; and
   performing the relaxed RRM measurement during a period according to the information and the configuration, wherein the period is associated with a state of the UE.

2. The method of claim 1, wherein performing the relaxed RRM measurement includes one or a combination of:
   skipping a neighbor cell measurement;
   performing the relaxed RRM measurement with a first interval;
   performing the relaxed RRM measurement with the dedicated frequency, the dedicated cell, or a combination of the dedicated frequency and the dedicated cell;
   skipping the neighbor cell measurement and performing a serving cell measurement with a second interval;
   skipping the serving cell measurement and performing the neighbor cell measurement with a third interval; and
   performing the serving cell measurement with a fourth interval and performing the neighbor cell measurement with a fifth interval;
   wherein,
      the first interval, the second interval, the third interval, and the fifth interval are longer than a time interval for a corresponding normal measurement; and
      the fourth interval is the time interval for the corresponding normal measurement.

3. The method of claim 1, further comprising:
   receiving a duration, a maximum number, and a threshold; and
   detecting a number of frequencies within the duration, wherein the number is equal to or less than the maximum number and qualities of the detected frequencies are equal or greater than the threshold, and wherein the relaxed RRM measurement is performed at the detected frequencies.

4. A base station for wireless communication, comprising, comprising:
   at least one memory; and
   at least one processor coupled with the at least one memory and operable to cause the base station to:
      transmit information to a user equipment (UE) on a condition for enabling a relaxed Radio Resource Management (RRM) measurement so that the UE performs the relaxed RRM measurement during a period according to the information, wherein the period is associated with a state of the UE, wherein the condition indicates that the UE is within a zone; and
      transmit a configuration of a dedicated frequency, a dedicated cell, bandwidth parts (BWPs), or a combination of the dedicated frequency, the dedicated cell, and the BWPs for cell selection or cell reselection within the zone associated with the relaxed RRM measurement.

5. A user equipment (UE) for wireless communication, comprising, comprising:
   at least one memory; and
   at least one processor coupled with the at least one memory and operable to cause the UE to:
      receive information on a condition for enabling a relaxed Radio Resource Management (RRM) measurement, wherein the condition indicates that the UE is within a zone;
      receive a configuration of a dedicated frequency, a dedicated cell, bandwidth parts (BWPs), or a combination of the dedicated frequency, the dedicated cell, and the BWPs for cell selection or cell reselection within the zone associated with the relaxed RRM measurement; and perform the relaxed RRM measurement during a period according to the information and the configuration, wherein the period is associated with a state of the UE.

6. The UE of claim 5, wherein the at least one processor is further configured to cause the UE to:
receive a duration, a maximum number, and a threshold; and
detect a number of cells within the duration, wherein the number is equal to or less than the maximum number, and channel qualities of the detected cells are equal or greater than the threshold, wherein the relaxed RRM measurement is performed to the detected cells.

7. The UE of claim 5, wherein the at least one processor is further configured to cause the UE to:
receive a timer; and
perform a normal RRM measurement when the timer expires.

8. The UE of claim 5, wherein the at least one processor is further configured to cause the UE to:
receive the period, wherein the period is dedicated to the state of the UE and the state includes mobility information of the UE, a position of the UE, or a combination of the mobility information and the position of the UE.

9. The UE of claim 5, wherein the at least one processor is further configured to cause the UE to:
receive service type information; and
select the period according to the service type information, wherein the period is dedicated to the state of the UE and the state includes a service type of the UE.

10. The UE of claim 5, wherein the at least one processor is further configured to cause the UE to:
receive the period, wherein the period is associated with the state of the UE and the state includes a number of cell reselection performed by the UE within a time window.

11. The UE of claim 5, wherein the condition indicates that the UE is adjacent to an edge of a cell and the UE moves within a coverage of the cell.

12. The UE of claim 5, wherein the condition indicates that a serving cell measurement value is equal to or less than a threshold, and the UE is with low mobility or the UE is stationary.

13. The UE of claim 5, wherein the condition indicates that:
a serving cell measurement value is less than a threshold and the serving cell measurement value is larger than another threshold;
the serving cell measurement value is equal to or less than the threshold and the serving cell measurement value is larger than the other threshold;
the serving cell measurement value is less than the threshold and the serving cell measurement value is equal to or larger than the other threshold; or
the serving cell measurement value is equal to or less than the threshold and the serving cell measurement value is equal to or larger than the other threshold, wherein the condition further indicates that the UE is associated with low mobility or the UE is stationary.

14. The UE of claim 13, wherein the UE is associated with the low mobility or the UE is stationary, and wherein a number of cell reselections performed by the UE within a time window is less than a threshold or a variation of the serving cell measurement value is equal to or less than another threshold.

15. The UE of claim 5, wherein the zone is determined by the UE or a base station.

16. The UE of claim 15, wherein the at least one processor is further configured to cause the UE to:
record behavior of the cell selection and the cell reselection of the UE; and
transmit, according to the behavior of the UE, an indication that the UE selected or reselected at least one cell or at least one frequency within the zone.

17. The UE of claim 5, wherein the condition indicates that the UE connects to the base station via a relay node.

18. The UE of claim 17, wherein the at least one processor is further configured to cause the UE to:
receive other information from the relay node, wherein the other information indicates that the relay node selects to a new cell or the relay node searches a new neighbor cell, or indicates whether to perform the cell selection or the cell reselection.

19. A processor for wireless communication, comprising:
at least one controller coupled with at least one memory and operable to cause the processor to:
receive information on a condition for enabling a relaxed Radio Resource Management (RRM) measurement, wherein the condition indicates that a user equipment (UE) is within a zone;
receive a configuration of a dedicated frequency, a dedicated cell, bandwidth parts (BWPs), or a combination of the dedicated frequency, the dedicated cell, and the BWPs for cell selection or cell reselection within the zone associated with the relaxed RRM measurement; and
perform the relaxed RRM measurement during a period according to the information and the configuration, wherein the period is associated with a state of a UE.

20. The base station of claim 4, wherein the at least one processor is further configured to cause the base station to transmit a duration, a maximum number, and a threshold, wherein a number of cells detected within the duration is equal to or less than the maximum number, and channel qualities of the detected cells are equal or greater than the threshold, wherein the relaxed RRM measurement is performed to the detected cells.

* * * * *